(12) United States Patent
Sun et al.

(10) Patent No.: US 9,744,672 B2
(45) Date of Patent: Aug. 29, 2017

(54) SYSTEMS AND METHODS FOR COMMUNICATING ROBOT INTENTIONS TO HUMAN BEINGS

(71) Applicants: Yu Sun, Tampa, FL (US); Michael David Coovert, Plant City, FL (US); Ivan Shindev, Tampa, FL (US)

(72) Inventors: Yu Sun, Tampa, FL (US); Michael David Coovert, Plant City, FL (US); Ivan Shindev, Tampa, FL (US)

(73) Assignee: University of South Florida, Tampa, FL (US)

( * ) Notice: Subject to any disclaimer, the term of this patent is extended or adjusted under 35 U.S.C. 154(b) by 541 days.

(21) Appl. No.: 14/355,347

(22) PCT Filed: Nov. 16, 2012

(86) PCT No.: PCT/US2012/065592
§ 371 (c)(1),
(2) Date: Apr. 30, 2014

(87) PCT Pub. No.: WO2013/074969
PCT Pub. Date: May 23, 2013

(65) Prior Publication Data
US 2014/0316570 A1    Oct. 23, 2014

Related U.S. Application Data

(60) Provisional application No. 61/560,405, filed on Nov. 16, 2011.

(51) Int. Cl.
*G06G 7/48* (2006.01)
*B25J 11/00* (2006.01)
(Continued)

(52) U.S. Cl.
CPC ......... *B25J 11/0005* (2013.01); *B25J 9/1674* (2013.01); *G05D 1/0246* (2013.01);
(Continued)

(58) Field of Classification Search
CPC ... B25J 9/1674; B25J 11/0005; G05D 1/0246; G05D 1/0274; G05B 2219/40196; G05B 2219/40202; G05B 2219/40414
(Continued)

(56) References Cited

U.S. PATENT DOCUMENTS

2009/0098792 A1    4/2009  Cheng
2010/0222925 A1*   9/2010  Anezaki ............... G05D 1/0221
                                                    700/253

OTHER PUBLICATIONS

Peltason et al. "Modeling Human-Robot interaction Based on Generic Interaction Patterns". Dialog with Robots: Papers from the AAAI Fall Symposium (FS-10-05). 2010. p. 80-85.*

(Continued)

*Primary Examiner* — Eunhee Kim
(74) *Attorney, Agent, or Firm* — Thomas | Horstemeyer, LLP

(57) ABSTRACT

In one embodiment, communicating robot intentions to human beings involves determining movements that a robot will make to complete a task, visually communicating a long-term intention of the robot that provides an indication of the movements the robot will make in completing the task, and visually communicating a short-tem intention of the robot that provides an indication of a movement of the robot will make within the next few seconds in working toward completing the task.

30 Claims, 10 Drawing Sheets

(51) Int. Cl.
*G05D 1/02* (2006.01)
*B25J 9/16* (2006.01)
(52) U.S. Cl.
CPC . *G05D 1/0274* (2013.01); *G05B 2219/40196* (2013.01); *G05B 2219/40202* (2013.01); *G05B 2219/40414* (2013.01)
(58) Field of Classification Search
USPC ..................................... 703/7; 700/250, 255
See application file for complete search history.

(56) References Cited

OTHER PUBLICATIONS

Van Krevelen et al. "A Survey of Augmented Reality Technologies, Applications and Limitations". The International Journal of Virtual Reality, 2010, p. 1-20.*
Green et al. "Evaluating the Augmented Reality Human-Robot Collaboration System". 15th International conference on Mechatronics and Machine Vision in Practice (M2VIP08),Dec. 2-4, 2008. p. 575-580.*
Green et al., 'Human-Robot Collaboration: A Literature Review and Augmented Reality Approach in Design', International Journal of Advanced Robotic Systems, Dec. 31, 2008, vol. 5, Issue 1, pp. 1-18 See abstract, pp. 10,11, and figure 16.
Adhami et al., 'Planning, simulation, and augmented reality for robotic cardiac procedures: The STARS system of the ChIR team'. Seminars in Thoracic and Cardiovascular Surgery, Apr. 30, 2003, vol. 15, Issue 2, pp. 141-156 See the whole document.
Heo et al., 'Technical Trends of Projection-based Augmented Reality', Electronics and Telecommunications Research Institute, Electronic communication trend analysis, Oct. 31, 2011, vol. 26, Issue 5, pp. 92-100 See the whole document.
Stilman et al., 'Augmented reality for robot development and experimentation', Carnegie Mellon University, Robotics Institute, Technical Report CMU-RI-TR-05-55, Nov. 30, 2005, pp. 1-11 See the whole document.
International Search Report and Written Opinion dated Mar. 28, 2013.
Airenti, et al. "Failures, exploitations and deceits in communication", Journal of Pragmatics, 20(4):303-326, 1993.
Airenti "Is a naturalistic theory of communication possible?" Cognitive Systems, 11(2):165-180, 2004.
Ajzen "The theory of planned behavior" Organizational Behavior and Human Decision Processes, 50:179-211, 1991.
Barr, et al. "Anchoring comprehension in linguistic precedents", Journal of Memory and Language, 46(2):391-418, 2002.
Bates "The role of emotion in believable characters", Communications of the ACM, 37:122-125, 1994.
Betkowska, et al. "Robust speech recognition using factorial HMMs for home environments", EURASIP Journal on Advances in Signal Processing, 1:1-9, 2007.
Blumberg "Old tricks, new dogs: ethology and interactive creatures", Ph.D. Dissertation, Massachusetts Institute of Technology, 1996.
Cox "Representation, construction, externalised cognition and individual differences", Learning and Instruction, 9:343-363, 1999.
De Ruiter, et al. "Exploring the cognitive infrastructure of communication", Interaction Studies, 11(1):51-77, 2010.
Durrant-Whyte, et al. "Simultaneous Localization and Mapping (SLAM): Part I The essential algorithms", Robotics and Automation Magazine, 13(2):99-110, 2006.
Fong, et al. "A survey of socially interactive robots", Robotics and Autonomous Systems, 42:143-166, 2003.
Fritsch, et al. "A flexible infrastructure for the development of a robot companion with extensible HRI capabilities", IEEE International Conference on Robotocs and Automation, Barcelona, Spain, 2005.
Fung, et al. "An augmented reality system for teaching sequential tasks to a household robot", RO-MAN, 282-287, 2011.
Li, et al. "Why and how to model multi-modal interaction for a mobile robot companion", AAAI Spring Symposium on Interaction Challenges for Intelligent Assistants, 2007.
Matsumaru "Mobile Robot with Preliminary-announcement and Display Function of Following Motion using Projection Equipment", 15th IEEE Int. Symp. on Robot and Human Interactive Communication (RO-MAN 06), 443-450, 2006.
Quellette, et al. "Habit and intention in everyday life: The multiple processes by which past behavior predicts future behavior", Psychological Bulletin, 124(1):54-57, 1998.
Sakaue, et al. "A real-life test of face recognition system for dialogue interface robot in ubiquitous environments", International Conference on Pattern Recognition, 2006.
Sweller, et al. "Why some material is difficult to learn", Cognition and Instruction, 12(3):185-233, 1994.
Takayama, et al. "Expression Thought: Improving Robot Readability with Animation Principles", Proceedings of Human-Robot Interaction Conference: HRI 2001, Lausanne, CH, 69-76, 2011.
Wilson "Human information behaviour", Journal of Informing Science, 3(2):49-56, 2000.
Zhang "A flexible new technique for camera calibration", IEEE Transactions on Pattern Analysis and Machine Intelligence, 22(11):1330-1334, 2000.

* cited by examiner

SYSTEMS AND METHODS FOR COMMUNICATING ROBOT INTENTIONS TO HUMAN BEINGS

CROSS-REFERENCE TO RELATED APPLICATION

This application is the 35 U.S.C. §371 national stage of, and claims priority to and the benefit of, PCT application PCT/US2012/065592, filed Nov. 16, 2012, which claims priority to and the benefit of U.S. Provisional Application No. 61/560,405, filed on Nov. 16, 2011, herein incorporated by reference in its entirety.

BACKGROUND

When people who are not experts in robotics first encounter a robot they may be excited and curious but usually have no idea what the robot can and will do. For example, when a mobile robot moves around in a human living environment, people may act cautiously and nervously around it mainly because they do not know what the robot will do next and they feel the need to prepare themselves for its sudden and unexpected movements. They may observe the robot carefully and use their cognition systems to make sense of its motions and predict its intentions. Unfortunately, there typically is not a clear indication of the robot's next move, and the programming built into the robot is not observable by people who cohabitate with it. The direction in which a robot will turn is not obvious by looking at it, and it is typically not possible to know if it will speed up or slow down, or if it will stop or proceed to run over an object. Without knowing what a robot will do next, humans cannot act appropriately and collaboratively with the robot. If those persons could know the intention of the robot and its next move at all times, they would feel much more comfortable and at ease around them.

Communication between humans and robots holds the key to building a human-robot synergic relationship. Humans can collaborate efficiently since they have the ability to make judgments about the intentions of others as they listen to others' auditory expression and witness them in action. Humans rely upon intention perception to understand the current actions of others and predict their next moves and decide what their own action should be in an attempt to synchronize and influence the actions of others. In the context of a mobile robot, a human not only must understand the current motion of the robot but also must perceive the robot's intention in order to predict its next move so as to actively collaborate with the robot and create synergy.

One approach to enable such communication is to design robots that can express themselves as humans do so that humans can identify the robot's intentions as they observe them in action (as humans do with other humans). However, it is unrealistic to require all the robots coexisting with humans to have human-like appearance, kinematics, and dynamics. A robot's motion, by nature, is far different from regular human motion. The motions humans consider to be unnatural are rooted in the physical properties and configurations of robots. A robot's material, actuators, and sensors are fundamentally different from humans, and yield rather different patterns of acceleration, deceleration, and the like. A robot is designed to amplify its strengths and efficiently perform certain tasks. These differences provide robots with abilities that humans do not have, such as super speed and extreme precision. Moreover, human-like robotic manipulators do not always move as human arms because the manipulators have different kinematics and ranges of motion. For example, a typical robotic wrist has a large rolling motion (close to 360 degrees) and the human wrist can only roll between approximately 90 and 180 degrees. Although limiting a robot's wrist motion to make it more human-like could help humans anticipate its movements, it would also significantly reduce the robot's capability and, at least in part, defeat the purpose of utilizing a robot to perform the task.

In view of the above discussion, it can be appreciated that it would be desirable to have means for enabling humans to better anticipate actions of a robot.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have means for enabling humans to better anticipate actions of a robot. Disclosed herein are systems and methods for communicating robot intentions to human beings. More particularly, described herein is a systematic approach to derive short-term, mid-term, and long-term intentions from a robot's task state machine and express the intentions using robot-centered spatial augmented reality (RCSAR) so that the humans and robots can perform tasks collaboratively and even form a synergic relationship. Described in detail below is an implementation of that approach utilized on a mobile robot. The robot was evaluated in an experiment whose results suggest that people can more accurately predict where a robot is going in the short-term, mid-term, and long-term with the RCSAR intention expression. Those people were more confident in their interpretations of the robot and liked the robot significantly more because of its RCSAR intention expression.

In the following disclosure, various specific embodiments are described. It is to be understood that those embodiments are example implementations of the disclosed inventions and that alternative embodiments are possible. All such embodiments are intended to fall within the scope of this disclosure.

The best way for a human being to understand the movements and discern the intentions of a robot is to have the robot express its intentions explicitly. While there are various ways for a robot to do this, the approach described in this disclosure involves systematically deriving a robot's short-term, mid-term, and long-term intentions from its task state machine and superimposing the intention information on objects within the robot's surrounding environment with spatial augmented reality. Doing so clearly illustrates the planed action of the robot and its strategies linked directly to the objects and the environment, thereby enabling human users to collaborate without holding or wearing any special equipment.

Figure 1:
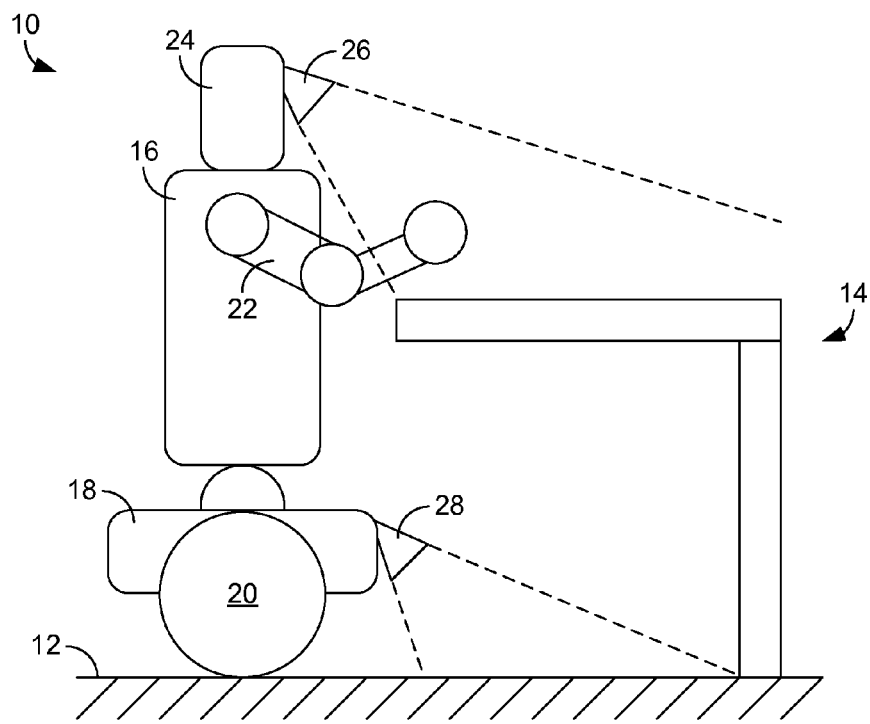
FIG. 1 is a schematic drawing of an embodiment of a mobile robot.

FIG. 1 schematically illustrates a robot 10, in the form of a mobile manipulator, within an environment that includes a floor surface 12 and a table 14. As is shown in that figure, the robot 10 generally comprises a body 16 that is supported by a base 18 that is in turn supported by wheels 20 that enable the robot to travel along the floor surface 12. The robot 10 incorporates some human-like features, including arms (manipulators) 22 and a head 24. Mounted to the robot 10 is a camera 26 that enables the robot 10 to view its environment and a projector 28 that enables the robot to project images onto objects within its environment that convey the robot's intentions. In the example illustrated in FIG. 1, the camera 26 is mounted to the head 24 and the projector 28 is mounted to the base 18. It is noted, however, that alternative mounting locations are possible.

Figure 2:
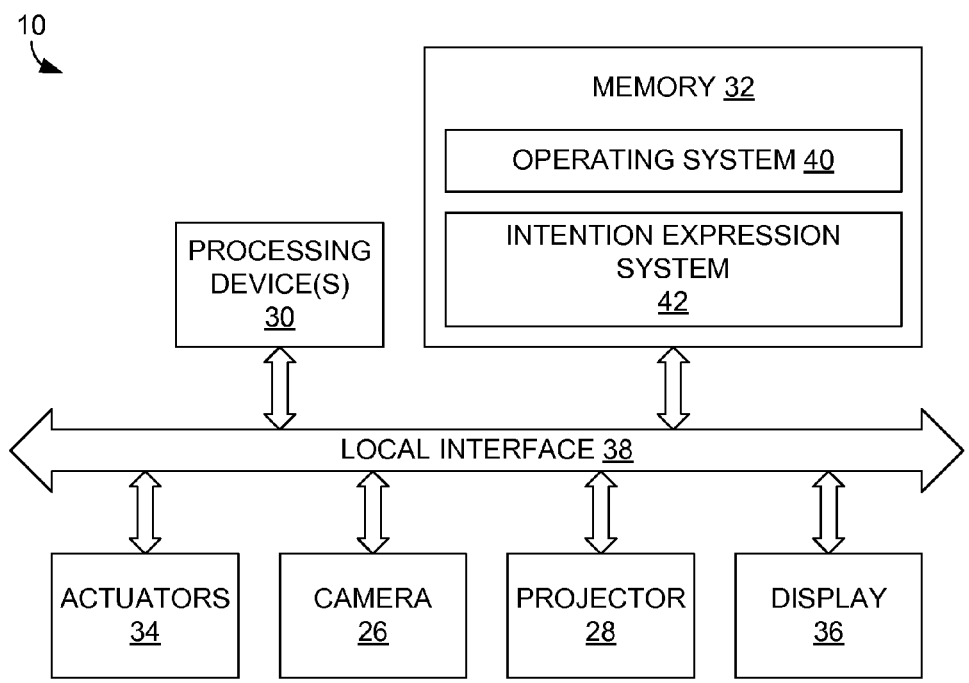
FIG. 2 is a block diagram of an embodiment of a configuration for the robot of FIG. 1.

FIG. 2 illustrates an example configuration for the robot 10. As is shown in FIG. 2, the robot 10 comprises one or more processing devices 30, memory 32, one or more actuators 34, the camera 26, the projector 28, and a display 36, each of which is connected to a local interface 38.

The processing devices 30 can include a central processing unit (CPU) as well as a three-dimensional (3D) graphics processing unit (GPU), each of which being capable of executing instructions stored within the memory 32. The memory 32 includes any one of or a combination of volatile memory elements (e.g., RAM) and nonvolatile memory elements (e.g., hard disk, ROM, tape, etc.).

The actuators 34 comprise the components that are used to drive motion of the robot 10 and can include one or more controllers and/or motors that enable actuation of the wheels 20 and/or arms 22. The camera 26 and projector 28 are those that were described above in relation to FIG. 1. The display 36 is an optional component that, like the projector 28, can be used to convey the intentions of the robot 10.

The memory 32 (a non-transitory computer-readable medium) stores programs (i.e., logic) including an operating system 40 and an intention expression system 42. The operating system 40 controls general operation of the robot 10 and therefore executes user commands to control actions of the robot. In some embodiments, the operating system 40 can comprise a finite-state machine (FSM) that operates in one of a finite number of states at a time and can change from one state to another when initiated by a triggering event. The intention expression system 42 is configured to communicate the robot's intentions of carrying out those commands and performing those actions to humans so that they can anticipate the actions. As described in greater detail below, the intention expression system 42 can in some embodiments be used to cause the projector 28 to project images onto objects in the environment to convey the intention. In such cases, the intention expression system 42 further calibrates the camera 26 with the projector 28 to ensure that the images are projected on the intended objects. In other embodiments, the intention expression system 42 can be used to display images or animations on the display 36 to convey the intention.

Figure 3:
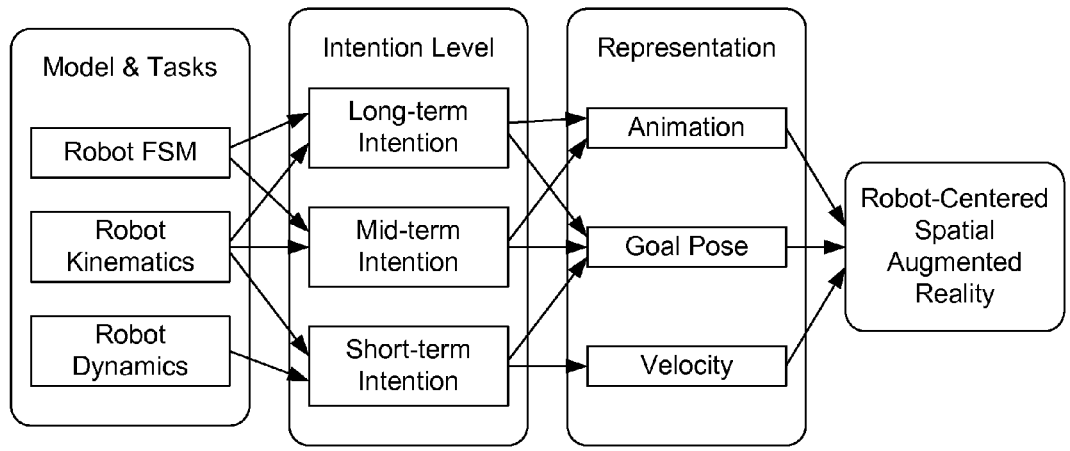
FIG. 3 is a block diagram that illustrates an embodiment of systematic intention expression.

The projection of images to convey robot intentions will now be discussed in detail. To achieve such functionality, the robot first derives a set of intentions from its programmed tasks and its kinematic and dynamic models, and then represents the intentions with a proper format for rending on its environment. This intention expression approach is illustrated in the diagram of FIG. 3. As is shown in that diagram, there are short-term, mid-term, and long-term intentions. Short-term intentions are those that pertain to imminent actions, such as actions that the robot will perform in the next few seconds. Long-term intentions relate to overall goals that the robot intends to achieve or overall tasks that the robot intends to complete. Finally, mid-term intentions are those that pertain to changes in state that occur as a result of a triggering event that occurs while the robot is working toward completing the overall task. Obviously, different levels of intentions require the derivation of distinctive information. The programmed task and the kinematic models can be used to derive both the mid-term and long-term intentions. To derive a short-term intention, only the kinematic and dynamic models and the low-level controller are needed.

Figure 4:
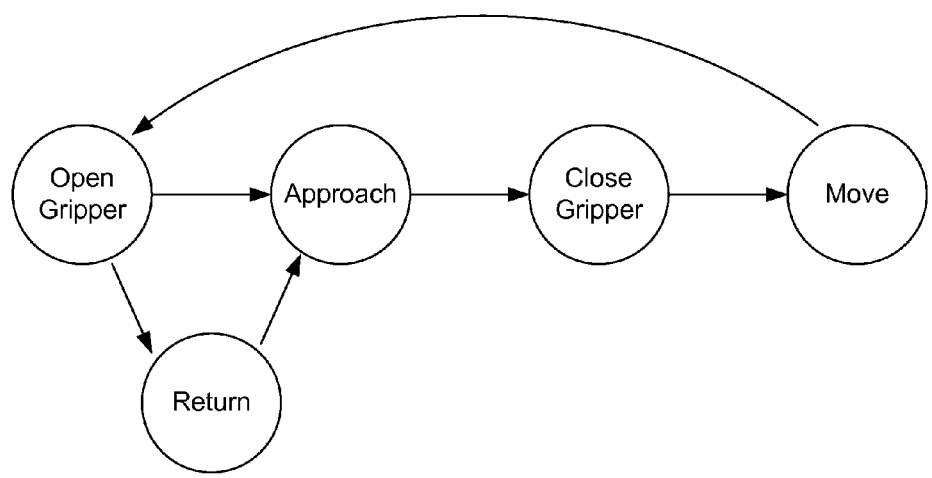
FIG. 4 is diagram of an embodiment of a finite-state machine for a grasping task.

If a robot is programmed or taught to carry out a task presented with a finite-state machine, the software can be implemented with unified modeling language (UML), which is a standardized general-purpose modeling language in object-oriented software engineering. FIG. 4 depicts one simple finite-state machine that is used to represent a simplified pick-and-place task. In this example, the robot has five motion states: open gripper, approach, close gripper, move, and return. The state machine provides the relation between the different states. The long-term and mid-term intention can be naturally derived from the finite-state machine. The long-term intention is the strategy the robot has decided to use and it represents this strategy expressed in a series of states the robot will take to accomplish it. The strategy is decided at the beginning of the task and subject to change during task performance. The mid-term intention is the next state the robot will transition to after a triggering event. It represents the fine motion planning results the robot has computed and will precisely follow. A mid-term intention does not change dynamically, but a new mid-term intention can be generated when the robot changes its mind when it detects a triggering event and transits to another state.

For many robotic applications, robot motions are computed in their configuration spaces and the states are represented in configuration spaces as well. Usually, the pose of a robot can be described with a set of joint variables, and the pose of the end-effector can be computed with forward kinematics. Even though the joint variables are a convenient representation for motion planning and robotic control, it is often difficult to directly relate them to the physical world. The joint variable would also not be intuitive to human coworkers, since humans observe and interact with the robot and obstacles in the world's space and not in the robot's configuration space. For intention expression, one is interested in not only the pose of the end-effector but also the pose of all the robot's links because, for safety reasons, human coworkers need to be aware of the ongoing and upcoming physical motion of the robot as well as the end-effector. Therefore, the motion in the state machines can be represented by the poses of all links instead of the joint variables.

The short-term intention is the immediate next motion the robot will take. It can be represented either in velocities or the immediate next pose. For example, for a mobile robot, the short-term intention could be the robot's next heading and velocity. In any robot motion planning algorithm, a next motion is usually computed at the beginning of a state (or even before that state) as a part of a defined motion trajectory that is used to control the robot. Therefore, for any given moment, the control input to the robot from the motion planner is the short-term intention.

It is well accepted that for humans, the visual sense/perceptual system is primary, followed by the auditory and, subsequently, the tactile or haptic perception systems. These systems enable humans to understand and interact with the world around them. It is not surprising that these are the systems used to signal and interpret intentions. Yet, there is not always a "best" modality to handle communication of intention because intention is often both task dependent and conditioned upon the exchange of those involved. As such, it is important for humans and robots to signal intentions via the modalities (visual, auditory, tactile) inherent in the existing system of communication.

Auditory expression is a good choice for communicating simple intentions because it is intuitive and naturally-interactive with natural language conversations. However, loud sounds may not be acceptable in a quiet environment such as hospitals and museums. Furthermore, frequent announcements can be disruptive or annoying, and it can be difficult to convey intentions for complicated motion using auditory expression. For some applications, visualizing the intention is more intuitive because it is possible to express a far more complex intention motion and even an abstract goal with a visual display. A well-designed visualization may reduce cognitive load and amplify human's cognition ability. Compared with an informationally-equivalent auditory textual or description of an intention, a graphical animation may enable human coworkers to avoid having to explicitly derive the intention from auditory wording. With visual expression, human coworkers can discern the robot's intention with a single glance. The focus of the intention expression with visualization is to organize and render the intended motion in such a way that it will be easily accessed and readily comprehended.

In the one approach, digital content depicting the robot intention motion can be superimposed on the real objects and physical environment to generate a clear illustration of robot motion. There are a number of technical challenges to overcome to do this. Some of the challenges are in the nature of spatial augmented reality (SAR), and other are unique to robot SAR. As with existing SAR, the digital content should align with the objects and environment with minimal error. The content generation process is very challenging in that both the robot and the environment may be dynamically changing. The display surfaces are typically not flat nor do they have ideal colors upon which to project, furthermore the objects and environment often take any arbitrary shape. The intention motion should be represented with a digital content that is intuitive and easily perceived by the human.

The short-term intended motion can be represented either in velocities or the immediate next pose. For example, for a mobile robot, the short-term intended motion could be its next heading and velocity. At each time point, the robot's planned motion in next $\tau$ seconds can be expressed. $\tau$ is decided on the human's reflex times for different expression modalities. As an example, $\tau$ can be set to 3 seconds. Different graphical expressions are proper for different kind of robots and applications. For a mobile robot, for example, the heading and velocity can be expressed with a directional arrow. The scale of the velocity can be naturally represented with the length of the arrow. To express the whole range of the short-term intended motion in velocity and with the limited display range of a SAR, a mapping is computed and used to obtain the correct scales of the arrows to optimize the range of the display. The potential motion range of the robot is computed from the robot's kinematic and dynamic models, while the display range of a SAR is computed from projector-camera calibration and the projector's extrinsic parameters.

Long-term and mid-term intentions are represented through goal poses, an intermediate key pose, or a sequence of poses for animation. Ideally, the poses and the sequence of poses should be rendered with correct overlay directly upon the operated objects in the environment. For example, consider a pick-and-place task. A mid-term intention is represented with the planned grasping points and flashing highlights can be rendered on the desired grasping points of the objects to be picked up. For long-term intention, this could be represented with the planned placing position through rendering the object at that position.

Similar to regular SAR, to ensure the precise alignment of the digital content with the real environment and objects, the projector-camera pair should be calibrated and 3D information of the environment and objects relative to the projector-camera pair should be obtained as well. This process does not demand any overhead as the robot computes the required 3D information for motion planning anyhow. In robot-centered SAR, the robot is constantly moving in the environment and the objects and the motion of the robot both should therefore be tracked at all times.

Figure 5:
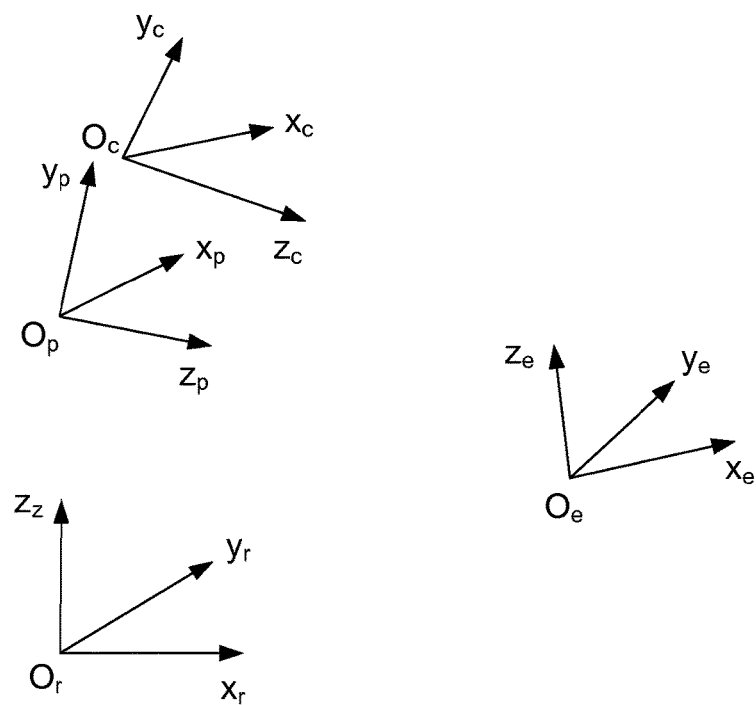
FIG. 5 is a diagram of example coordinate systems in robot-centered spatial augmented reality (RCSAR) calibration.

As the 3D environment information is obtained relative to the robot, the projector-camera pair for SAR is calibrated in the robot coordinate system in terms of the extrinsic parameters, i.e., the positions and orientations of the projector and the camera. Camera-projector calibration techniques such as the Zhang method can be utilized. As suggested by the coordinate systems shown in FIG. 5, a chessboard can be placed in the environment in coordinate system $O_e$, and the projector and the camera can be calibrated related to the chessboard to obtain a transformation matrix $T_{ce}$ and $T_{pe}$. This is achieved by finding corners on an image of a chessboard with known measurements. The detected corners are then compared with their real world locations calculated from the chessboard dimensions in order to solve for the unknown parameters using triangulation. The transformation $T_{re}$ from the robot coordinate system to the environment coordinate system can be obtained with 3D sensors either on the robot or a motion capture system fixed in the environment.

The intrinsic parameters of the projector and the camera should also be calibrated. The projector model is simply the inverse of camera calibration using this same model. One can quickly contemplate and see that the projector can be considered similar to a camera in that there is an image plane inside each device representing a real world plane on the chessboard. The primary difference being that the light rays travel in opposite directions.

Figure 6:
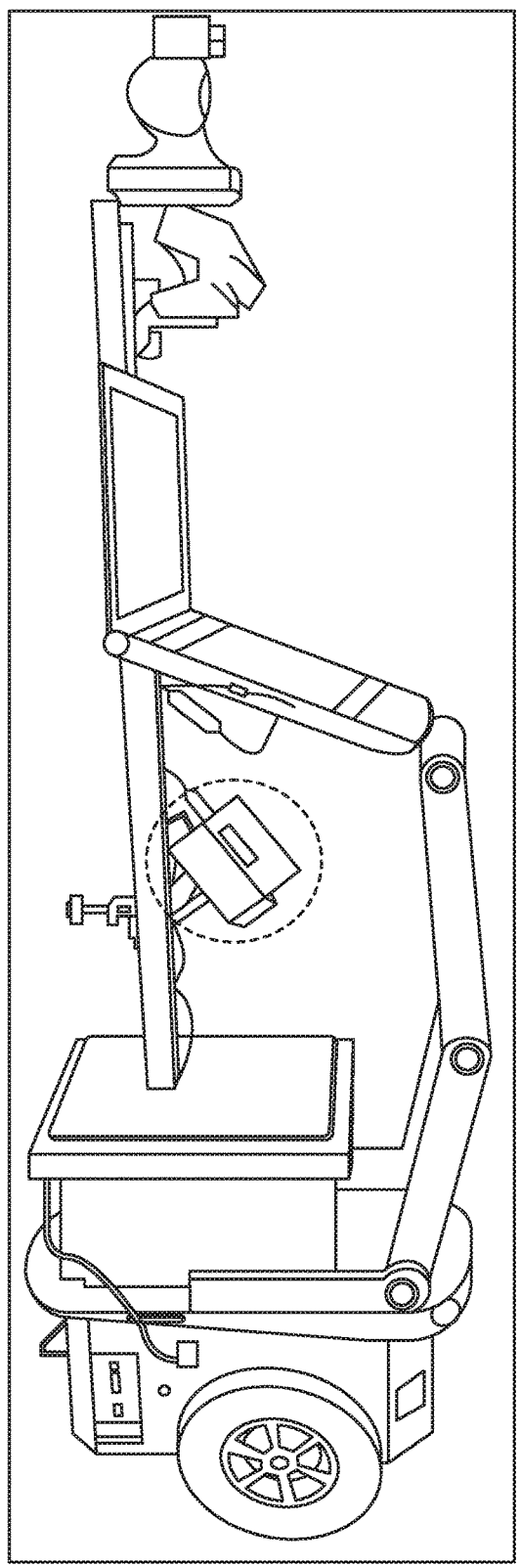
FIG. 6 is a photograph of a prototype mobile robot that incorporates RCSAR.

A prototype robot was developed to test the above-described intention expression approach. An autonomous mobile system, which is shown in photograph of FIG. 6, was constructed based on an Adept® MobileRobots Pioneer 3-DX differential drive robot. A particle filter-based simultaneous localization and mapping (SLAM) algorithm and path planning algorithm were developed and integrated into a robot operating system (ROS). The software ran on an Acer® Iconia dual-touchscreen laptop equipped with a Microsoft® Kinect for 3D perception. The mobile robot could navigate completely autonomously with the Kinect sensor data, and it also could be tele-operated through wireless Internet. For intention expression, the system was equipped with a speaker for auditory expression and an Optoma ML300, WXGA with 300 Lumen (circled in FIG. 6) for SAR. The projector was rigidly mounted on the frame and pointed to the floor in order to render the robot's intention. The projector was calibrated with the assistance of the Kinect in the manner described above.

For this mobile robot with two degrees of freedom, intention derivation can be performed not only based on motion and speed, but also based on observable robot tasks. The most obviously observable tasks of the mobile robot are navigation in free space, navigation around an obstacle, and navigation to a goal position. These three tasks are classified as the mobile robot's short-term, mid-term, and long-term intentions. For any given state of the mobile robot, the robot's position and the orientation and surrounding free space/obstacles can be determined. Those parameters can be used as inputs to the robot's finite-state machine to determine the robot's next state.

Figure 7:
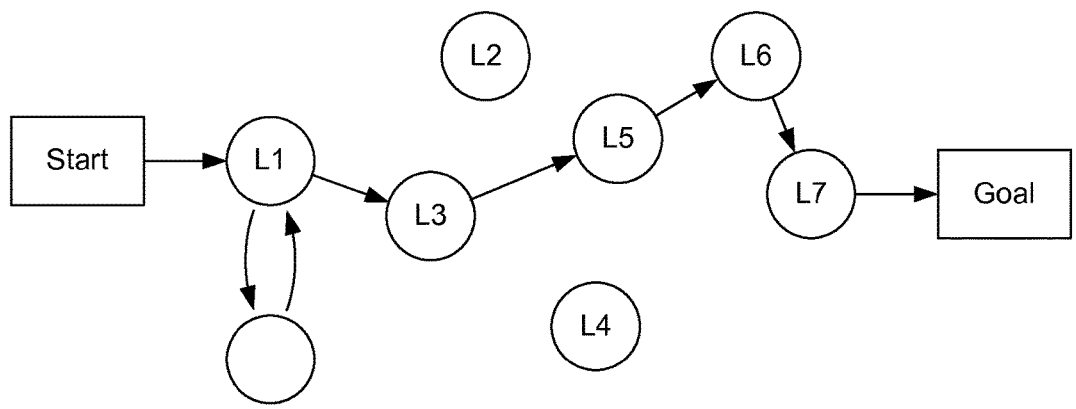
FIG. 7 is a diagram of an example probabilistic roadmap (PRM) path planning result.

After defining a start and a goal position, the robot runs a probabilistic roadmap (PRM) motion-planning algorithm on the current map to generate a series of landmarks for the robot to go through to reach the goal. The robot navigation is designed with an UML state machine. FIG. 7 illustrates an example of the motion planning state machine. The PRM algorithm generates a path that goes through landmark $L_1$, $L_3$, $L_5$, $L_6$, and $L_7$ to reach the goal. Each state represents a local path planner and a controller. The planner and controller compute a trajectory for the robot to follow from the previous landmark to the next and controls the robot enabling it to follow the trajectory. During the execution of each state, obstacle detection is concurrently performed to detect obstacles that were not on the map. If there is an unexpected obstacle, a collision avoidance handler is executed to re-plan the path. FIG. 7 depicts one example collision avoidance state.

As described above, the short-term intention is the heading and velocity the robot will take in the next few (e.g., 3) seconds. The intention is determined in the trajectory generator and controller. For the experimental system, that intention was displayed at all time, except when either of the other two intentions were expressed.

At a landmark (waypoint), including the start, the robot illustrates the next state in the state machine as the mid-term intention, which is usually the computed trajectory to reach next waypoint. If an unexpected obstacle is detected at any point of the navigation, it triggers a state transition and jumps to the obstacle avoidance state. Then the next state is the obstacle avoidance handler. In either situation, a local path is generated as the current mid-term intentions. The mid-term intention is displayed when there is a state transition.

The long-term intention in the experimental system was both the goal position and the global path the robot decides to take as generated by the PRM algorithm. Both the goal and the path are dynamic. So the long-term intention is displayed whenever a new path is computed.

The described procedure for robot intention expression has been developed and implemented as an independent module (intention expression module), in the ROS. The intention expression module provides an interface to the main motion-planning module to obtain the robot's mid-term and long-term goals, as well as its next planned motion. The module also communicates with the control module of the ROS to control the hardware, which could include speakers, projectors, and wireless transmitter for tactile wrist bands, belts, or vests.

The projector and Kinect were each calibrated in the robot coordinate system as described above. The Kinect obtains the RGBD environment map at 30 frames per second (fps). For navigation purpose, robot location and orientation is represented in the environment coordinate system.

Figure 8A:
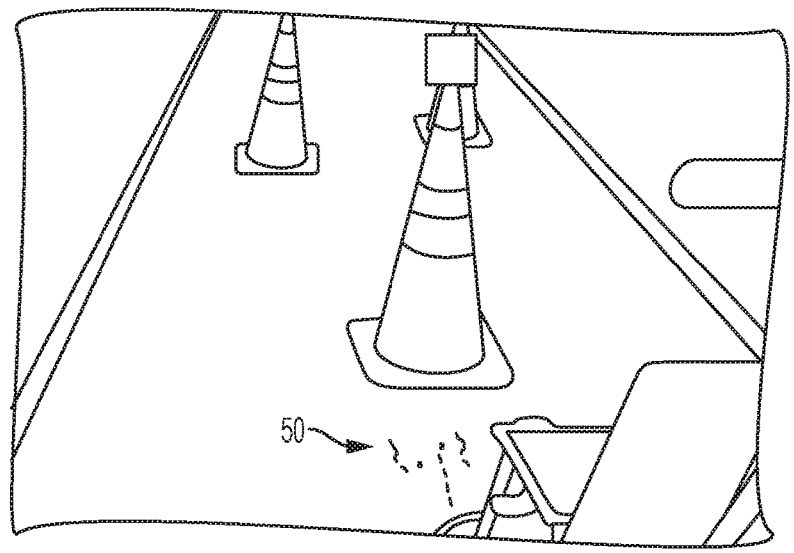
FIGS. 8A-8C are photographs illustrating long-term, mid-term, and short-term intentions, respectively, that are projected onto the robot's operating environment.

While some of the intention expression can be superimposed on the real environment using SAR, some cannot. As the mobile space of a robot is generally much larger than the valid projecting area of a projector, rendering the long-term intention on the real environment is unfeasible much of the time. A compromise is to project the developed environment map onto the environment in alignment with that environment. An example of such a map 50 is shown in FIG. 8A, which is one of several figures of FIG. 8 that illustrates examples of short-term, mid-term, and long-term intention expressions in the context of a robot travelling down a hallway to reach a programmed destination. The map 50 comprises an image of the environment and the destination for the robot in completing its programmed task. As is shown in FIG. 8A, the map 50 has been projected onto the floor in front of the robot. As is also apparent from that figure, by aligning the map with the environment, a human observer need not think about position and scale. This results in less mental computation for those observers as compared to that which would be required in interpreting the same information displayed on a monitor.

Figure 8B:
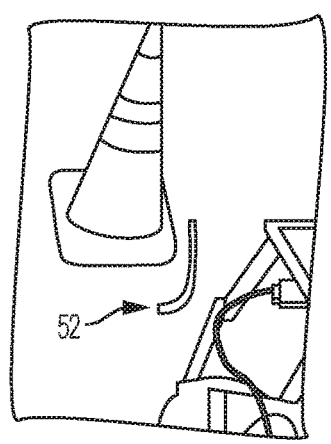

Since the projector can cover a large area, the mid-term intention (intended trajectory) can be projected and superimposed on the real environment. The calibration results are used to generate the correct image to be projected so the trajectory is rendered at the correct locations on the environment. With this spatial augmented display, the relationship between the planned path and the real-world is obvious. FIG. 8B illustrates an image 52 of an intended trajectory for the robot, i.e., a mid-term intention. As is shown in that figure, the image 52 comprises a curved line that identifies a path that will enable the robot to avoid an obstruction in the form of a traffic cone.

Figure 8C:
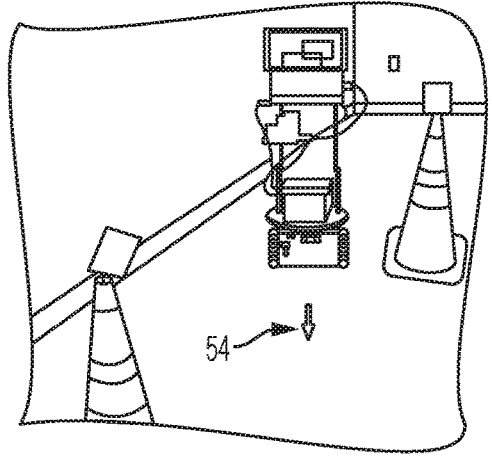

To express short-term intention, an arrow can be used to indicate the heading of the robot for the next step, and the length of the arrow can indicate velocity. The short-term projection algorithm calculates the difference between the robot's current orientation and the robot's next orientation, as well as the time needed for this change of state. A few seconds before the robot changes its orientation, the robot can create an animation that rotates the 3D arrow and orients it to the intended robot positioning. The robot orientation and the arrow rotation are both calculated in real-world space. FIG. 8C illustrates an image 54 of an arrow that reveals the short-term intention of the robot.

Notably, all short-term, mid-term, and long-term intentions are dependent upon the simultaneous localization and mapping (SLAM) algorithm. Knowing the robot's current position and orientation will improve the alignment, and incorrect data may only confuse the observer.

An experiment was designed to examine how people respond to a robot-centered SAR expressing short-term, mid-term, and long-term intentions. It was hypothesized that when a robot displayed these projections, people would be able to more accurately identify where the robot is going than when the robot did not display visual projections. Whether or not projections would lead to increased confidence on the part of the observer regarding the path the robot would follow was examined. Further, the participants' attitude toward the robot was investigated and it was hypothesized that viewing RCSAR provided by the robot would result in the robot being seen in a more positive fashion. Lastly, descriptive data was gathered regarding the areas of improvement people wanted based upon interaction with the robot.

Figure 9:
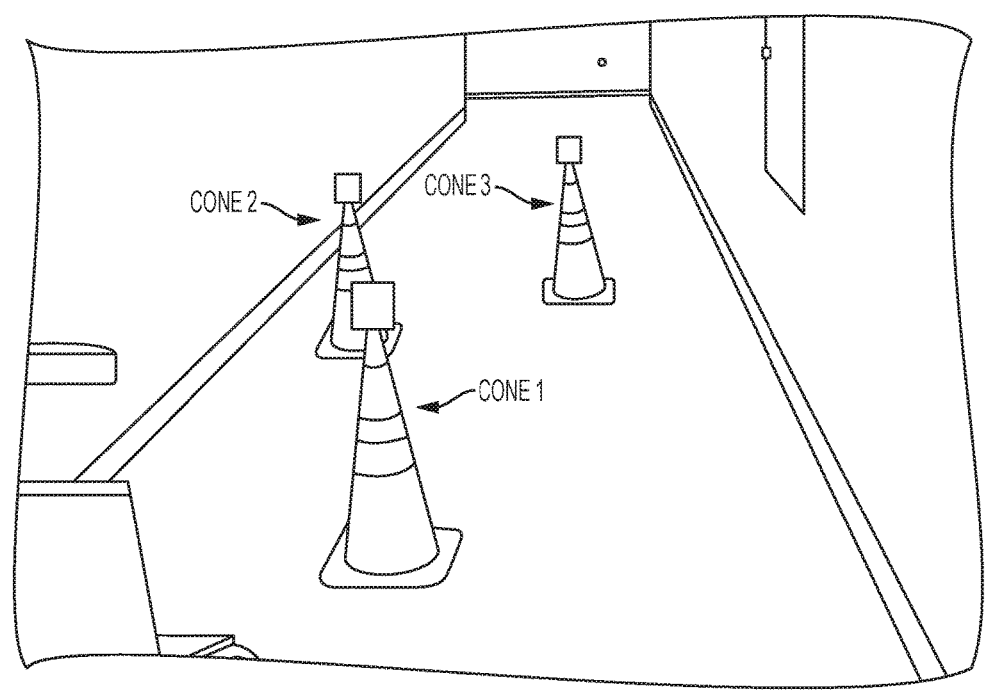
FIG. 9 is a photograph of an experiment environment including three traffic cones.

Participants in the study ranged from elementary and middle school students to middle-aged adults. Thirty-one participants were in the robot-centered SAR group, and 24 participants were in the no robot-centered SAR group. The robot and three marked cones were set up an experiment room. The robot was programmed to travel along a path and approach a first traffic cone (Cone 1), travel around it, and ultimately reach either a second or third traffic cone (Cone 2 or Cone 3) as its final destination. A picture of the path and the three cones are shown in FIG. 9.

Participants were given instructions to observe the robot as it moved around the room and to answer each question of a questionnaire only when the experimenter instructed them to do so. The questionnaire comprised several two-part questions, with the first part soliciting the participant's assessment of the robot's intended movement and the second part soliciting the participant's confidence rating in their assessment of the robot's intended movement. Each question on the questionnaire corresponded to a certain stage in the experiment and action of the robot. For participants in the projection group, the first question focused on the stationary robot displaying a map and the planed path projection of its long-term intention (as in FIG. 8A). The robot then began moving along its programmed path. The second question corresponded to a second stage where the robot displayed an arrow projection of its short-term intention (as in FIG. 8C). A third question inquired about a third stage in which the robot displayed a local path superimposed on the environment to indicate its mid-term intention, i.e., to approach and move around an obstacle, Cone 1.

A fourth question assessed the utility of the robot in displaying the map projection again, however, this time the robot was not stationary but en route to its final location, Cone 3 (stage 4). The questions at each stage assessed both where the participant thought the robot was going and how confident the participant was in their interpretation. The robot paused for 30 seconds at each stage, displaying the image of its intention, as the participants recorded their responses. For participants in the no RCSAR condition, all actions of the robot were the same, however, the robot paused for 30 seconds at each stage without displaying any visual projections. The data gathered from this part of the experiment enables one to address whether the robot-centered SAR have an effect on participants' identification and confidence of the robot's movement.

The last two questions of the questionnaire asked the participant to rate how much they liked the robot and to report what they wanted to change about the robot. With these data, the hypothesis that seeing projections from the robot lead to higher ratings of liking the robot can be tested. Additionally, insight can be gained on aspects of the robot that people pay attention to or care about during this interaction with the robot.

It was hypothesized that participants who are provided visual projections are more accurate in identifying where the robot intended to go than participants who are not provided this visual communication. Chi-square analyses reveal significant differences between the projection versus no projection groups for each of the four conditions: long-term movement intention when the robot is at the start of the path, $\chi^2(2)=32.17$, $p<0.001$; short-term movement intention, $\chi^2(4)=24.59$, $p<0.001$; mid-term movement intention, $\chi^2(1)=8.15$, $p<0.01$; and long-term movement intention at the end of the path (close to its final destination), $\chi^2(2)=27.82$, $p<0.001$.

More specifically, in the group with RCSAR, 74% of participants correctly identified the robot's long term intention compared to 0% of participants in the group without projections. Eighty-seven percent of participants who saw projections correctly identified "forward" as the robot's short term intention, while only 25% of participants did so in the group without projections. For mid-term intention, 94% of participants provided projections correctly answered "around the cone" compared to 63% of participants who were not provided projections. Lastly, for long-term intention at the fourth stage, 87% of participants who saw projections correctly identified the intended final destination of the robot while participants who were not provided projections answered "Cone 3" only 17% of the time.

These results support the hypothesis that group condition and response are associated. People who see projections from the robot are more able to correctly identify the robot's long-term, short-term, and mid-term movement intentions. Additionally, the majority of participants were able to correctly identify Cone 3 as the robot's long term intention at both the first and fourth stages. This indicates that people are able to interpret the map-like long-term intention projection when the robot is at different distances from its intended destination, either far or close.

Next, whether the projections affect participant's confidence in their assessments of where the robot was going was assessed. Confidence ratings were obtained on a scale of 1 (not at all confident) to 7 (extremely confident). Results of independent samples t-tests show a significant difference between confidence ratings of the two groups when assessing the robot's long term intention at the start of its path, $t(52)=3.425$, $p=0.001$; short term intention, $t(53)=4.796$, $p<0.001$; mid-term intention, $t(53)=4.541$, $p<0.001$; and long term intention at the end of its path, $t(53)=5.032$, $p<0.001$.

It is clear that participants who are provided projections are significantly more confident in their assessments of the robot's long-term, short-term, and mid-term intentions, compared to participants who are not provided visual projections from the robot.

Pearson correlation was performed between participants' total confidence rating and rating of the robot's likeability. The two variables are significantly correlated, $r(53)=0.446$, $p=0.001$, suggesting that more confidence in assessing the robot's intentions is associated with having a more favorable attitude toward the robot.

Next, an independent samples t-test was conducted to compare mean ratings of robot likeability between the two groups. Consistent with the hypothesis, results showed a significant difference, $t(53)=2.674$, $p=0.01$ (mean for group with projections=5.84, mean for group without projections=4.58), such that participants who are provided projections view the robot in a more positive light than participants who are not provided projections by the robot.

Finally, individuals were asked to respond to an open-ended question about what they would like to see in a robot communicating intentions of movement. Of the 24 participants who wanted to change the robot, the majority said movement (e.g., "make it move faster"). Five participants wanted to change the robot's communication capability ("more audio cues," "not very conversational," "project a little better," "it should talk"). Three participants wanted to change the robot's appearance (e.g., "its body structure"). From these results, it is evident that the robot's movement, appearance, and communication are design factors that users find important during interaction.

As described above, a systematic approach has been developed to derive short-term, mid-term, and long-term intentions from a robot's task state machine and express those intentions using robot-centered spatial augmented reality (RCSAR). This approach enables humans and robots to perform tasks collaboratively and even form a synergic relationship. The new approach has been evaluated in an experiment and the results suggest that people tend to be more accurate in identifying where a robot is going in the short-term, mid-term, and long-term if the robot presents them with RCSAR.

It has been demonstrated that people are able to understand the digital spatial augmented reality content rendering around a moving robot by the robot and interpret them as the robot's intention. Furthermore, individuals are able to do this without any prior training. This communication medium also allows individuals to understand quickly, for example within 30 seconds of seeing the projection. The results provide support that designing robots with the ability to communicate via RCSAR helps people identify and feel more confident about the robot's short-term, mid-term, and long-term movements. Another benefit is this communication medium is that individuals have a more positive attitude toward the robot. Additionally, people's confidence is positively linked with liking the robot, i.e., the higher the confidence, the higher the liking for the robot.

Figure 10:
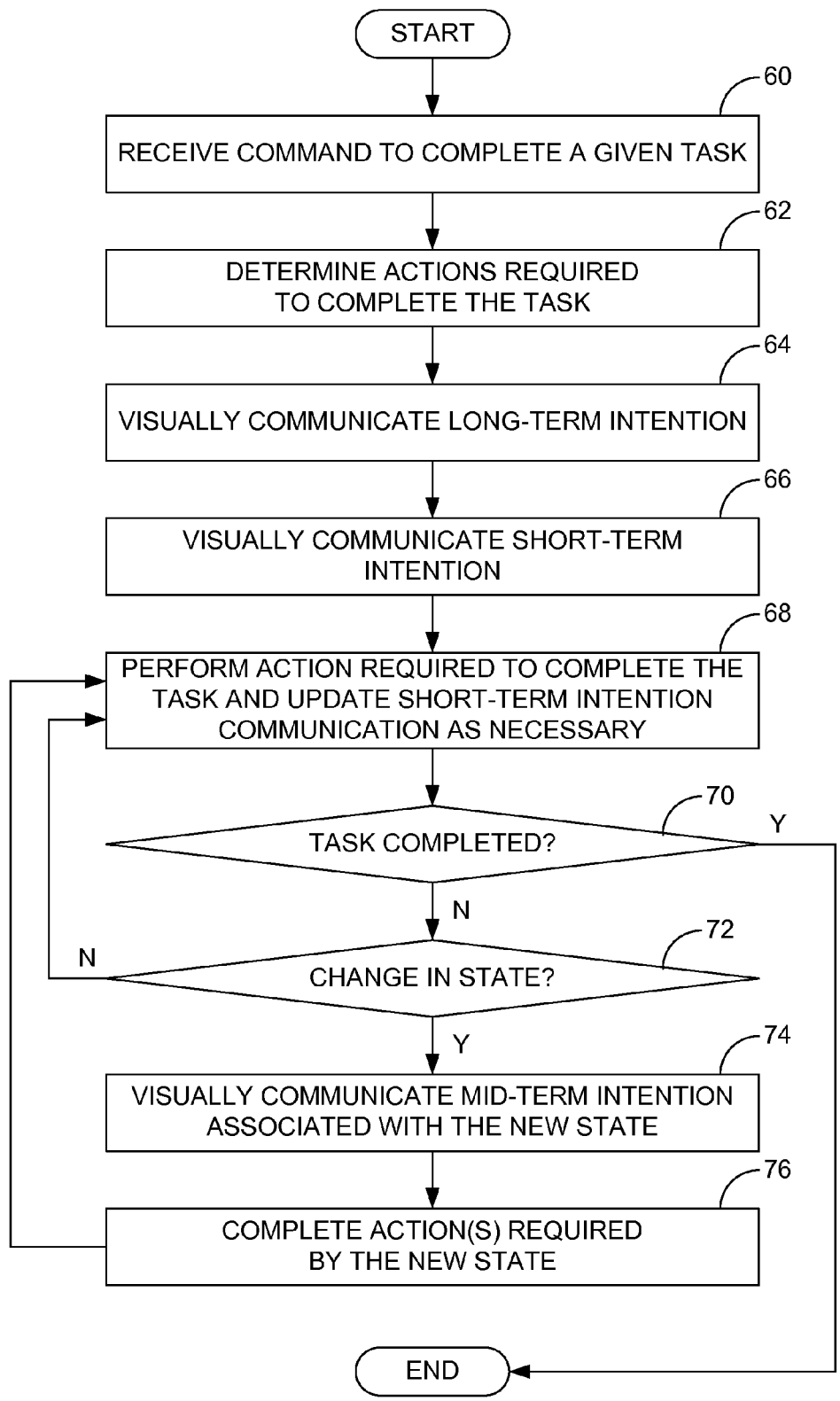
FIG. 10 is a flow diagram of a first embodiment of a method for communicating robot intentions.
Figure 11:
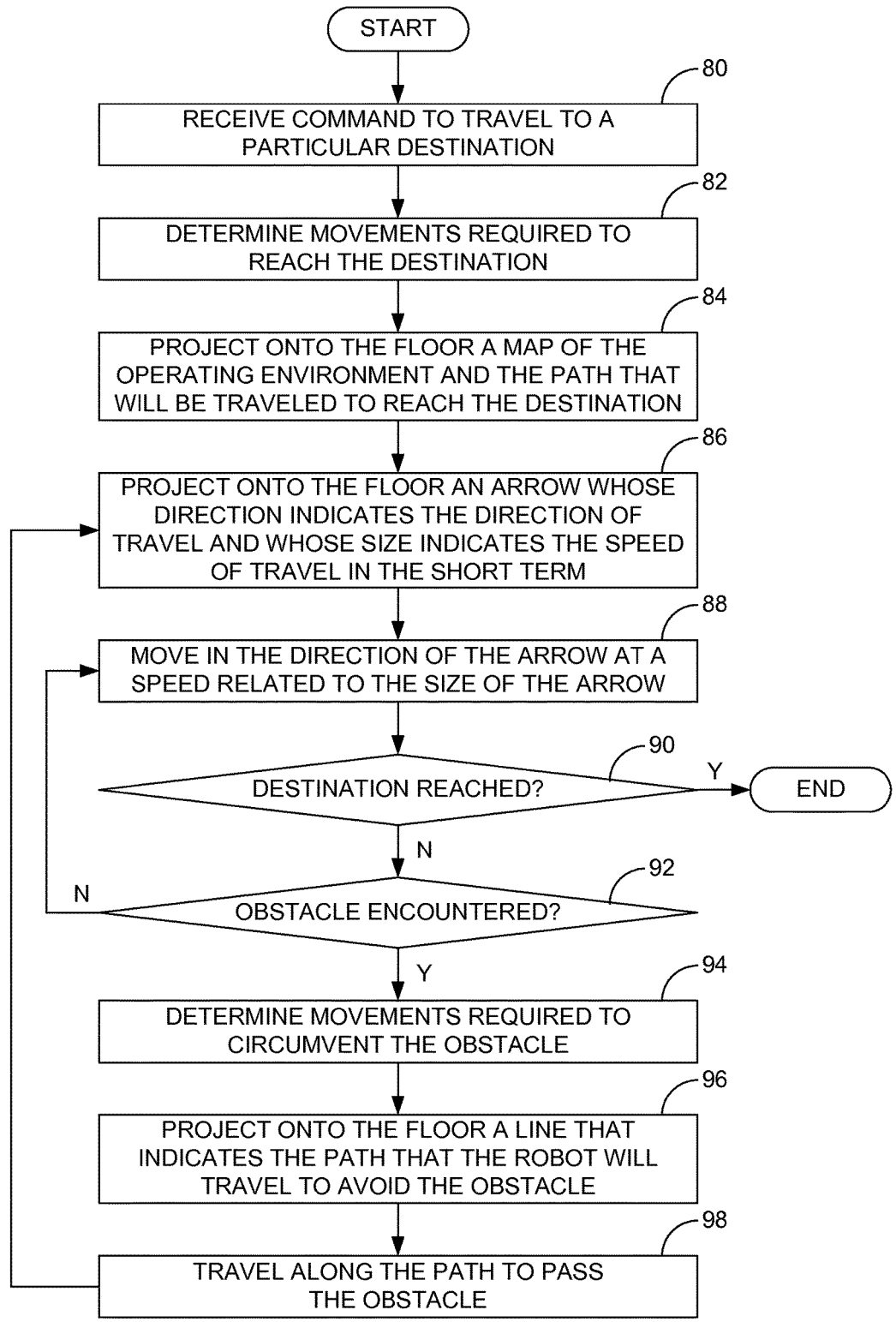
FIG. 11 is a flow diagram of a second embodiment of a method for communicating robot intentions.

FIGS. 10 and 11 are flow diagrams that provide examples of operation of a robot consistent with the above disclosure. FIG. 10 considers a general case of a robot performing a task, while FIG. 11 considers the specific example of a mobile robot traveling to a programmed destination. Beginning with FIG. 10, the robot receives a command to complete a given task, as indicated in block 60. Once having received the command, the robot determines the actions required to complete the task, as indicated in block 62. In some embodiments, this involves determining the different states of its finite-state machine in which the robot must act to complete the task. The nature of the task depends upon the particular situation. Example tasks include the robot moving to a particular location and the robot picking up an object. In each case, the robot will be moving in some manner to perform the task and it would be desirable for the robot to communicate how it is going to be moving to human beings within the operating environment.

Once the robot has determined the actions required to perform the task, the robot visually communicates its long-term intention, as indicated in block 64. The long-term intention is indicative of the nature of the task that is to be completed and can be conveyed in various ways. If the task is moving to a particular location, the conveyed long-term intention provides an indication that the robot will be traveling to that location and how. In some embodiments, travel to a destination can be communicated using a map of the environment in which the robot is operating. For example, as described above, a map of the environment can be projected onto the floor that includes an indication of the path that the robot will traverse to reach the destination. If the map is aligned with the environment so that features depicted in the map (e.g., walls) are aligned with their real-world counterparts, the map and the path are intuitive and easy to interpret by a human being. In other embodiments, the destination can be identified by projecting a marker (e.g., a "x") on the destination and the path to the marker can be projected on the floor in an augmented reality fashion so that human beings can see the actual path that the robot will traverse.

If the task is picking up an object, the conveyed long-term intention provides an indication as to the object that will be picked up and how. For example, if the robot is to pick up a box, the robot can project a marker onto the box to generally indicate that the box is going to be picked up. In addition or exception, the robot can project markers that identify the precise points at which the robot will contact the box when picking it up. In addition to identifying which object will be picked up and how, marking the object provides an indication to human beings in the operating environment as to whether or not the robot will be successful in completing the task. For example, if the markers are projected onto an object other than that which is to be picked up, the human being can infer that the robot is not properly calibrated and will not find the object where it expects to find it.

In cases in which the robot includes a display, the long-term intention can be conveyed by displaying an animation that depicts the robot performing the intended task. For example, if the robot is to move an object from one location to another, an animation showing an arm of the robot picking up the object and moving it to a new location can be displayed. Such an animation could be either projected onto the environment or displayed on an onboard display if the robot comprises one. The benefit of showing an animation is that it enables the user to see the intended movements of the robot in situations in which it may be difficult to do so from a map or projected markers or pathways. For example, if the robot projected a marker onto an object to be moved, that marker would not communicate to a human being the range of motion through which the robot's arm will pass in moving the object.

The long-term intention can be communicated for a suitable period of time (e.g., a few seconds) before the robot begins to perform the task. Once that time has passed, the robot can begin visually communicating its short-term intention, as indicated in block 66, which relates to the movements it will make in the immediate future. In cases in which the task is the robot traveling to a destination, the short-term intention can be visually communicated by projecting an arrow that provides an indication of the direction in and speed at which the robot will travel. As described above, the direction in which the arrow points will be the direction of travel for the robot and the size (length or thickness) of the arrow provides an indication of the speed. If the task is picking up or moving an object, the short-term intention can be visually communicated by displaying an animation depicting the movement of the robot in the short term.

Once the short-term intention has been visually communicated, the robot can perform the actions that are necessary to complete the task, as indicated in block 68. These actions include movements that are necessary to complete the task, whether they be movement of the robot toward the destination, movement of its arm toward an object, or some other movement. As is further indicated in block 68, the robot continually updates the short-term intention that is visually communicated as the movements are performed to provide ongoing indications as to the manner in which the robot will move next in the short term.

Flow from this point depends upon whether or not the task has been completed, as indicated in decision block 70. If the task has been completed, flow for the session is terminated and a new task can be performed. If not, flow depends upon whether a change in state is about to occur, as indicated in block 72. If not, flow returns to block 68 and the robot continues to perform the actions needed to complete the task and continues to update the short-term intention communication. If a change in state is going to occur, it can be because of any one of a number of triggering events. For example, if the task is for the robot to travel to a destination, a change of state will occur if the robot encounters an obstacle along its planned path. In such a case, the robot can enter a collision avoidance state to avoid collision and circumvent the obstacle. If the task is for the robot to pick up or move an object, the change of state can be the result of the robot completing one type of movement and having to perform a new type of movement. For example, as indicated in FIG. 4, the finite-state machine may include different states for opening a gripper of the robot's arm, approaching an object, closing the gripper on the object, and moving the object.

If a change in state is going to occur, flow continues to block 74 at which a mid-term intention associated with the state change is visually communicated. If the change of state was brought about by an obstacle encountered by the robot while traveling to a destination, the robot can, for example, project onto the floor an image of the path that the robot will take to circumvent the obstacle. If the change of state was brought about by the robot's arm reaching the point at which it can grasp an object, the robot can display an animation of the robot closing its gripper on the object. Irrespective of the visual communication that is provided, the robot can then complete the actions required by the new state, as indicated in block 76, and flow again returns to block 68.

Flow continues in the manner described above with the robot visually communicating its short-term intention and further communicating its mid-term intention when changes of state are required until the task is ultimately completed.

Figure 12:
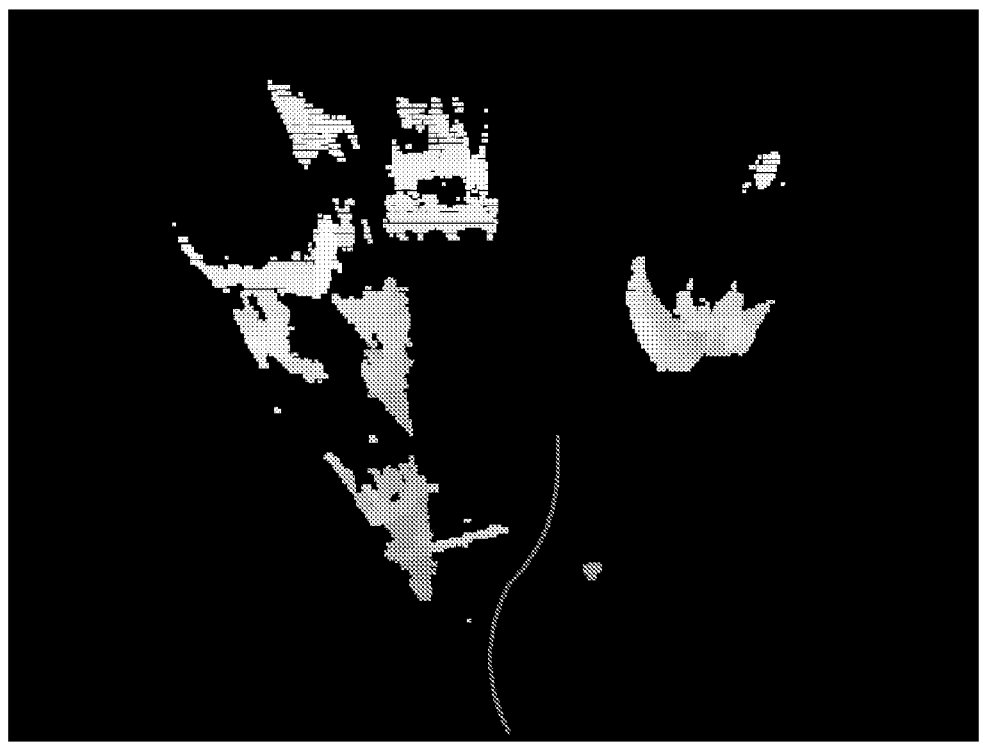
FIG. 12 is a screen shot of an example map that can be displayed or projected to convey a long-term intention.

FIG. 11 considers the specific case of a robot traveling to a destination and projecting visual cues as to its movement on the operating environment. Beginning with block 80, the robot receives a command to travel to a particular destination. The robot then determines the movements that are required to reach that destination, as indicated in block 82. Next, the robot projects onto the floor a map of the environment that includes an indication of the path that the robot will traverse to reach the destination, as indicated in block 84. A screen shot of an example map that can be projected is shown in FIG. 12.

Figure 13:
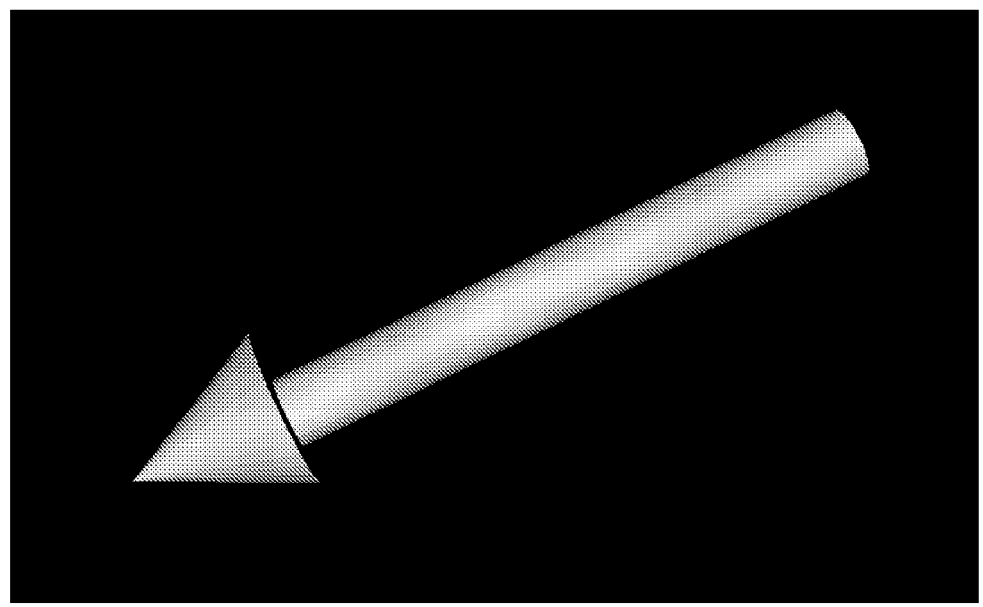
FIG. 13 is a screen shot of an example arrow that can be displayed or projected to convey a short-term intention.
Figure 14:
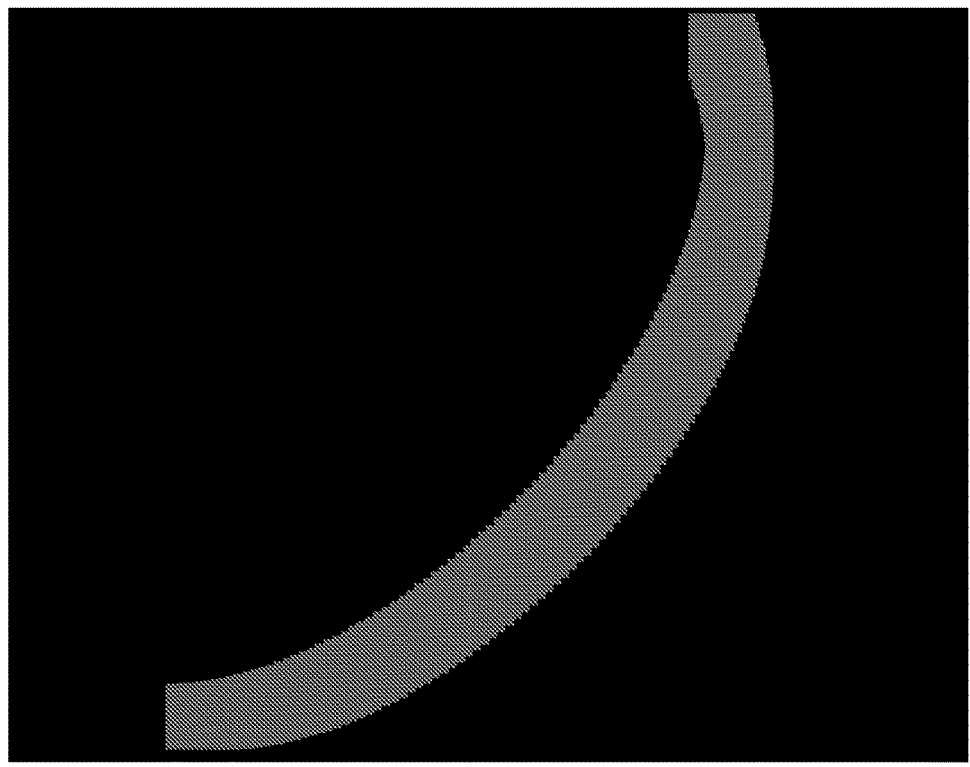
FIG. 14 is a screen shot of an example pathway that can be displayed or projected to convey a mid-term intention.

After the map has been projected for a few seconds, the robot can project onto the floor an arrow that provides an indication of the direction in which and speed at which the robot will travel in the short term, as indicated in block 86. A screen shot of an example arrow that can be projected is shown in FIG. 13. The robot can move in the direction of the arrow at a speed related to its size, as indicated in block 88. Flow from this point depends upon whether or not the destination has been reached, as indicated in decision block 90. If so, flow for the session is terminated. If not, flow can depend upon whether an obstacle has been encountered, as indicated in block 92. If not, flow returns to blocks 86 and 88, and the robot continues to project an arrow and move in the direction of the arrow. If an obstacle is encountered, however, the robot enters the collision avoidance state and the robot determines the movements required to circumvent the obstacle, as indicated in block 94. The robot then projects onto the floor a line that indicates the path that the robot will travel to avoid the obstacle, as indicated in block 96, and travels along the path to pass the obstacle, as indicated in block 98. A screen shot of an example path that can be projected is shown in FIG. 14.

After the obstacle has been circumvented, flow returns to blocks 86 and 88, and the robot continues to project the arrows and move in the direction of the arrows until either a further obstacle is encountered or the destination is reached.

With robot intention expression described above, human beings can predict what the robot intends to do. The human beings can therefore act upon the robot's future motion before it happens. This provides three possibilities, including human intervention, predictive collaboration, and expression perception feedback.

If the human being observes an intention expression by the robot that will likely lead to failure or damage, the human being will want to stop or pause the robot before the failure or the damage materializes. After stopping or pausing the robot, it is also possible to adjust the intention by directly interacting with the expressed intention. For a roboticist or a trained operator, it is normal to provide instructions of the next motion or goal pose with a computer, a joystick, or a tele-operating device. However, for those without robot-specific training or experience, those interfaces are not necessarily easy to use. In some embodiments, voice recognition software can be used to provide a simple and intuitive interface to interact with the robot's intention. The voice recognition software can be used to get the robot to respond to "stop" and "pause" commands. Simple voice recognition software is sufficient to reliably interpret and implement a limited instruction set from human beings.

In other embodiments, human beings can interact with the robot using a wireless remote controller that, for example, has "stop" and/or "pause" buttons that enable the human being to quickly stop the robot if desired. In some embodiments, the wireless remote controller can be implemented as a tactile vest or belt that is worn by the human being. The human being can select a factor mapped to the desired pose or motion to activate with the control buttons. In some embodiments, a finger-tracking-based intention interaction system can be used that will enable the human being to select the animated robot in display and move the robot's links to a desired goal pose.

The intention expression enables the human being to act collaboratively since the human being can always predict the robot's next move. For many tasks, instead of adjusting the robot motion, the human being can adjust an object's position to the robot's intended position to have the task carried without any interruption, even if the intended motion will miss the object originally. The disclosed intention expression framework can be integrated with fruitful human intention estimation approaches to form a full intention circle that will enable humans and robots to collaborate synergistically.

For a robot in field, feedback from the human being along with failure rate data can provide valuable information for the robot to dynamically adjust its preference on the expression modalities. If the robot fail tasks and there is no feedback from the human being, obviously, the human being does not perceive the intention well, and the robot can rotate representation weights and the expression weights in its intention expression graph to assign the current expression to the lowest weight and form a new expression pipeline to try other ways of expression. The intention expression graph can then be adapted to new tasks and new group of human beings using the dynamic updating mechanism.

The invention claimed is:

1. A method for communicating robot intentions to human beings, the method comprising:
determining movements that a robot will make to complete a task;
visually communicating a long-term intention of the robot that provides an indication of the movements the robot will make in completing the task; and
visually communicating a short-term intention of the robot that provides an indication of a movement of the robot will make in the immediate future in working toward completing the task, wherein visually communicating a short-term intention of the robot comprises superimposing an image onto an environment in which the robot operates that provides an indication of a movement the robot is about to make and at what speed.

2. The method of claim 1, further comprising deriving the long-term and the short-term intentions from a state machine of the robot.

3. The method of claim 1, wherein visually communicating a long-term intention of the robot comprises superimposing an image onto an environment in which the robot operates that provides an indication of a destination for the robot and a path the robot will take to reach the destination.

4. The method of claim 3, wherein superimposing an image comprises projecting onto the environment a map of the environment that includes an indication of the destination and the path.

5. The method of claim 4, wherein environmental features depicted in the map are aligned with the environmental features' real-world counterparts.

6. The method of claim 3, wherein superimposing an image comprises projecting a marker on the destination and projecting a path on the floor or ground that identifies the actual path the robot will traverse to reach the destination.

7. The method of claim 1, wherein visually communicating a long-term intention of the robot comprises displaying an animation that depicts the robot performing the task.

8. The method of claim 1, wherein visually communicating a short-term intention of the robot comprises superimposing an image onto an environment in which the robot operates that provides an indication of the direction in which the robot is about to travel and at what speed.

9. The method of claim 8, wherein superimposing an image comprises projecting an arrow onto the floor or ground, the arrow's direction identifying the direction in which the robot will travel and the arrow's size identifying the speed at which the robot will travel.

10. The method of claim 1, further comprising continually updating the visually-communicated short-term intention of the robot as the robot moves.

11. The method of claim 1, further comprising visually communicating a mid-term intention of the robot when a trigger event occurs that requires a change of state for the robot to a new state, the visually-communicated mid-term intention providing an indication of a manner in which the robot will move in the new state.

12. The method of claim 11, wherein the new state is a collision avoidance state that is entered when the robot encounters an obstacle and wherein visually communicating a mid-term intention comprises superimposing an image onto the floor or ground that provides an indication of a path the robot will traverse to avoid the obstacle.

13. An non-transitory computer-readable medium that stores an intention of the robot expression system for a robot, the system comprising:
logic configured to visually communicate a long-term intention of the robot that provides an indication of the movements the robot will make in completing the task; and
logic configured to visually communicate a short-term intention of the robot that provides an indication of a movement of the robot will make in the immediate future in working toward completing the task, wherein the logic configured to visually communicate a short-term intention of the robot comprises logic configured to superimpose an image onto an environment in which the robot operates that provides an indication of a movement the robot is about to make and at what speed.

14. The computer-readable medium of claim 13, wherein the logic configured to visually communicate a long-term intention of the robot comprises logic configured to superimpose an image onto an environment in which the robot operates that provides an indication of a destination for the robot and a path the robot will take to reach the destination.

15. The computer-readable medium of claim 14, wherein the image is a map of the environment that includes an indication of the destination and the path and wherein environmental features depicted in the map are aligned with the environmental features' real-world counterparts.

16. The computer-readable medium of claim 14, wherein the logic configured to superimpose an image comprises logic configured to project a marker on the destination and to project a path on the floor or ground that identifies the actual path the robot will traverse to reach the destination.

17. The computer-readable medium of claim 13, wherein the logic configured to visually communicate a short-term intention of the robot comprises logic configured to superimpose an image onto an environment in which the robot operates that provides an indication of the direction in which the robot is about to travel and at what speed.

18. The computer-readable medium of claim 17, wherein the image includes an arrow, the arrow's direction identifying the direction in which the robot will travel and whose size identifying the speed at which the robot will travel.

19. The computer-readable medium of claim 13, wherein the logic configured to visually communicate a short-term intention of the robot is configured to continually update the visually-communicated short-term intention of the robot as the robot moves.

20. The computer-readable medium of claim 13, further comprising logic configured to visually communicate a mid-term intention of the robot when a trigger event occurs that requires a change of state for the robot to a new state, the visually-communicated mid-term intention providing an indication of a manner in which the robot will move in the new state.

21. The computer-readable medium of claim 20, wherein the new state is a collision avoidance state that is entered when the robot encounters an obstacle and wherein the logic configured to visually communicate a mid-term intention comprises logic configured to superimpose an image onto the floor or ground that provides an indication of a path the robot will traverse to avoid the obstacle.

22. A robot that is configured to visually communicate the robot's intentions, the robot comprising:
- a processing device;
- one or more actuators; and
- memory that stores an intention expression system that is configured to visually communicate a long-term intention of the robot that provides an indication of the movements the robot will make in completing the task, and to visually communicate a short-term intention of the robot that provides an indication of a movement of the robot will make within the next few seconds in working toward completing the task, wherein visually communicating a short-term intention of the robot comprises superimposing an image onto an environment in which the robot operates that provides an indication of a movement the robot is about to make and at what speed.

23. The robot of claim 22, wherein the robot further includes a projector and wherein the intention expression system is configured to visually communicate the long-term and short-term intentions using the projector.

24. The robot of claim 22, wherein the intention expression system visually communicates a long-term intention of the robot by superimposing an image onto an environment in which the robot operates that provides an indication of a destination for the robot and a path the robot will take to reach the destination.

25. The robot of claim 24, wherein the image comprises a map of the environment that includes an indication of the destination and the path and wherein environmental features depicted in the map are aligned with the environmental features' real-world counterparts.

26. The robot of claim 24, wherein the image comprises a marker projected on the destination and a path projected onto the floor or ground that identifies the actual path the robot will traverse to reach the destination.

27. The robot of claim 23, wherein the intention expression system visually communicates a short-term intention of the robot by superimposing an arrow onto the floor or ground, the arrow's direction identifying the direction in which the robot will travel and the arrow's size identifying the speed at which the robot will travel.

28. The robot of claim 22, wherein the intention expression system is configured to continually update the visually-communicated short-term intention of the robot as the robot moves.

29. The robot of claim 22, wherein the intention expression system is further configured to visually communicate a mid-term intention of the robot when a trigger event occurs that requires a change of state for the robot to a new state, the visually-communicated mid-term intention providing an indication of a manner in which the robot will move in the new state.

30. The robot of claim 29, wherein the new state is a collision avoidance state that is entered when the robot encounters an obstacle and wherein the intention expression system visually communicates the mid-term intention by superimposing an image onto the floor or ground that provides an indication of a path the robot will traverse to avoid the obstacle.

* * * * *